United States Patent
Qian et al.

(10) Patent No.: US 11,368,633 B2
(45) Date of Patent: Jun. 21, 2022

(54) VIDEO SWITCHING METHOD BASED ON MULTI-CHANNEL DECODING

(71) Applicant: AMLOGIC (SHANGHAI) CO., LTD., Shanghai (CN)

(72) Inventors: Lei Qian, Shanghai (CN); Yingwei Long, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 91 days.

(21) Appl. No.: 16/341,502

(22) PCT Filed: Oct. 13, 2018

(86) PCT No.: PCT/CN2018/113141
§ 371 (c)(1),
(2) Date: Apr. 12, 2019

(87) PCT Pub. No.: WO2019/091320
PCT Pub. Date: May 16, 2019

(65) Prior Publication Data
US 2021/0368110 A1    Nov. 25, 2021

(30) Foreign Application Priority Data

Nov. 17, 2017    (CN) .......................... 201711086276.6

(51) Int. Cl.
H04N 5/268    (2006.01)
H04N 21/442    (2011.01)
H04N 21/443    (2011.01)

(52) U.S. Cl.
CPC ........... *H04N 5/268* (2013.01); *H04N 21/443* (2013.01); *H04N 21/4424* (2013.01)

(58) Field of Classification Search
CPC ... H04N 5/268; H04N 21/443; H04N 21/4424
See application file for complete search history.

(56) References Cited

FOREIGN PATENT DOCUMENTS

| CN | 102789390 | 11/2012 |
|----|-----------|---------|
| CN | 103686359 | 3/2014  |
| CN | 105451064 | 3/2016  |
| CN | 105979340 | 9/2016  |
| CN | 106131646 | 11/2016 |

*Primary Examiner* — Michael E Teitelbaum
(74) *Attorney, Agent, or Firm* — Fish IP Law, LLP

(57) ABSTRACT

The present invention provides a video switching method based on multi-channel decoding and comprising: starting the intelligent device to accomplish an initialization operation of a system file; closing the display of an image layer, decoding and displaying an obtained boot video on the video layer; after a system desktop launcher is started, displaying a main interface on the image layer in a transparent form; after a system is started, the intelligent device creates and displays a display layer on the image layer, wherein a display area of the display layer is smaller than that of the image layer; and decoding and displaying remotely obtained video data on the display layer. The invention avoids the issue of waiting for the loading of the video data of the online video for playing after the boot video ends, resulting in a relatively long waiting time and lowering the user experience.

8 Claims, 2 Drawing Sheets

VIDEO SWITCHING METHOD BASED ON MULTI-CHANNEL DECODING

CROSS-REFERENCE TO RELATED APPLICATIONS

The present application is a national phase of Ser. No. PCT/CN2018/113141 filed Oct. 31, 2018, the entire contents of which are incorporated herein by reference, and which claims priority to and the benefit of Chinese Patent Application No. 201711086276.6 filed Nov. 17, 2017.

CROSS-REFERENCE TO RELATED APPLICATIONS

The present application claims priority to and the benefit of Chinese Patent Application No. 201711086276.6, filed on Nov. 7, 2017, the entire content of which is incorporated herein by reference.

BACKGROUND OF THE INVENTION

1. Field of the Invention

The invention relates to the field of communication technologies, and more particularly, to a video switching method based on multi-channel decoding.

2. Description of the Related Art

During the boot process of an intelligent device, such as a smart television, a static logo is displayed for more than 5 seconds at first, then a boot video which lasts for at least 15 seconds starts playing. After the boot video ends, an online video recommended by a manufacturer starts playing on a launcher (a main interface provided by a system desktop launcher). The boot video to be displayed is about advertisements for profits. After the existing smart TV completes playing the boot video, if the online video is to be played immediately as desired, a prompt reading "video is buffering" will be displayed in the main interface, and the online video will be played later. Through analysis, it can be seen that some defects exist in the existing chip solution, such as Amlogic's chip solution. Specifically, it takes about 20 seconds from the startup of the intelligent device to the playing of the boot video, and it takes about 15 seconds from the startup of the intelligent device to initiation of the main interface. Thus, the main interface has been started when the TV video is still playing. In this case, waiting for the online video to be played on the main interface is a completely redundant process. Therefore, it is in urgent need of a method for entering the main interface for the playing of the video data of the online video immediately once the main interface is started.

SUMMARY OF THE INVENTION

In view of the above-mentioned problems existing in the boot process when the intelligent device plays the video data of the online video, the present invention provides a video switching method based on multi-channel decoding, which intends to provide a display layer not covering a video layer after the main interface is started, such that the obtained video data of the online video can be simultaneously played on the display layer when the intelligent device plays the boot video.

Specific technical solutions are as follows:

A video switching method based on multi-channel decoding, applied to the boot of an intelligent device, wherein a video layer and an image layer located on the video layer are provided, and the video layer is configured to play a boot video;

a system desktop launcher is provided, and after the system desktop launcher is started, a main interface is formed;

the video switching method comprises following steps:

Step S1, starting the intelligent device to accomplish the initialization operation of a system file;

Step S2, closing the display of the image layer, decoding an obtained boot video and displaying the boot video on the video layer;

Step S3, after the system desktop launcher is started, displaying the main interface on the image layer in a transparent form;

Step S4, after a system is started, the intelligent device creates a display layer and displays the display layer on the image layer, wherein a display area of the display layer is smaller than that of the image layer; and Step S5, decoding remotely obtained video data and displaying the video data on the display layer by the system desktop starter.

Preferably, in Step S2, the boot player closes the display of the image layer and displays the loaded boot video in the video layer.

Preferably, a method for displaying the main interface on the image layer in a transparent form comprises setting a background image and a view framework in the main interface to be invisible.

Preferably, after the system is started, the intelligent device starts a monitoring module while creating the display layer, and monitors whether the boot video ends through the monitoring module;

the system desktop launcher operates to change a display content of the main interface from an invisible transparent state to a state of a visible operation interface when the boot video ends.

Preferably, the boot video provides a play-ending flag bit, and a method for monitoring whether the boot video ends through the monitoring module comprises:

Step A1, the monitoring module providing a monitoring thread which is configured to be started when playing the boot video;

Step A2, the monitoring thread monitoring whether the play-ending flag bit is present or not;

if the result shows "NO", returning to Step A2;

if the result shows "YES", proceeding to Step A3;

Step A3, the system desktop launcher operating to change a display content of the main interface from an invisible transparent state to a state of a visible operation interface.

Preferably, display coordinates of the display layer are located at a lower left corner of the image layer.

Preferably, the display layer has a display size of 480*270.

Preferably, after Step S5, after the boot video ends, the display size of the display layer is switched to a full screen display status of the image layer.

Preferably, after Step S5, after the boot video ends, the display size of the display layer is switched to a full screen display status of the image layer, and the video data displayed in the image layer is adjusted from a mute state to a voiced state.

The above-mentioned technical solutions have the following beneficial effects. After the intelligent device is started, in the process of playing the boot video, a display layer superimposed on the video layer and not covering the video layer is formed after the main interface is started, and the obtained video data of the online video can be simultaneously played on the display layer, avoiding the issue of waiting for the loading of the video data of the online video for playing after the boot video ends, resulting in a relatively long waiting time and lowering the user experience.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
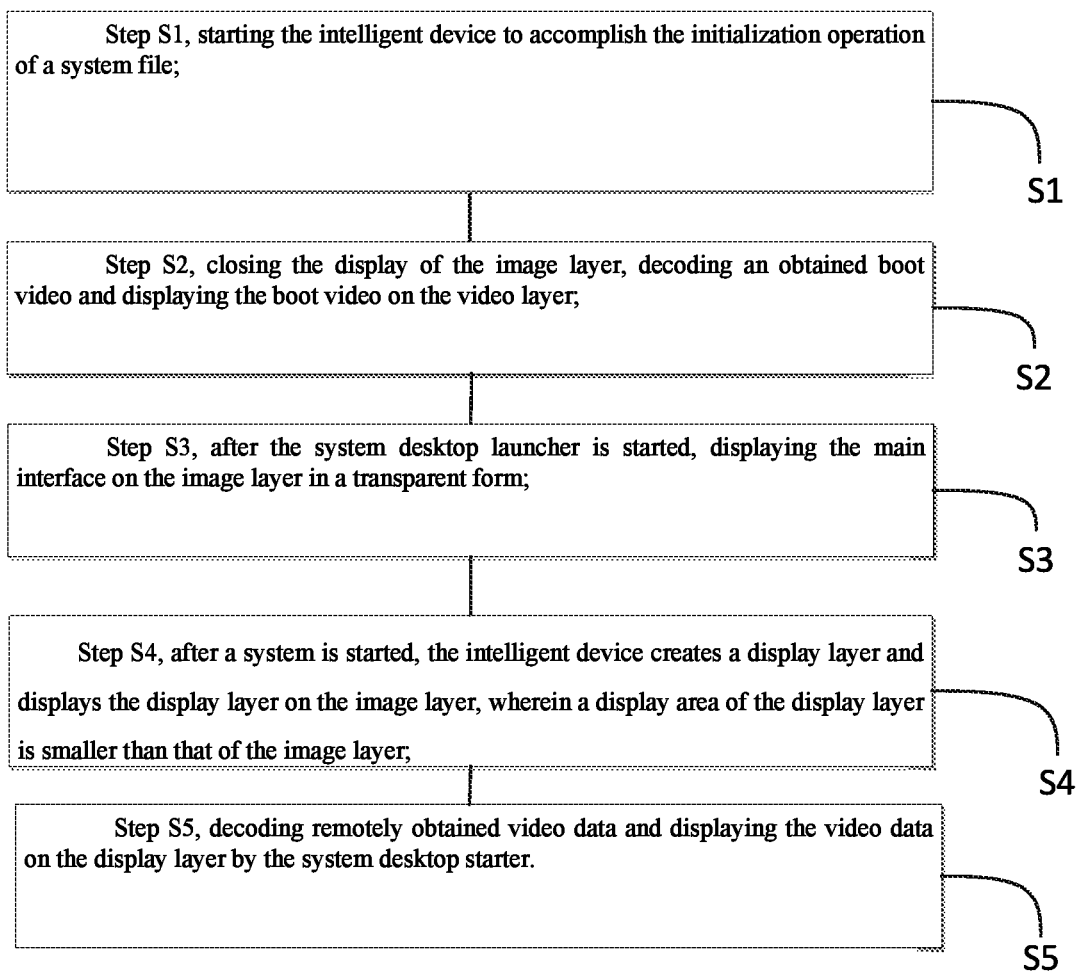
FIG. 1 is a flowchart of a video switching method based on multi-channel decoding according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The technical solution set forth in the present invention comprises a video switching method based on multi-channel decoding.

A video switching method based on multi-channel decoding, applied to the boot of an intelligent device, wherein a video layer and an image layer located on the video layer are provided, and the video layer is configured to play a boot video;

a system desktop launcher is provided, and after the system desktop launcher is started, a main interface is formed;

as shown in FIG. 1, the video switching method comprises following steps:

Step S1, starting the intelligent device to accomplish an initialization operation of a system file;

Step S2, closing the display of the image layer, decoding an obtained boot video and displaying the boot video on the video layer;

Step S3, after the system desktop launcher is started, displaying the main interface on the image layer in a transparent form;

Step S4, after a system is started, the intelligent device creates a display layer and displays the display layer on the image layer, wherein a display area of the display layer is smaller than that of the image layer; and Step S5, decoding remotely obtained video data and displaying the video data on the display layer by the system desktop starter.

For the prior art, after the intelligent device is started, it is required to wait for the video data of the online video to be loaded after the boot video ends, so as to complete the playing of the online video. However, by adopting the play mode, a user may have to wait for a relatively longtime.

In the present invention, based on the multi-channel decoding mode, after the intelligent device is started, in the process of playing the boot video, the main interface is displayed in the image layer in a transparent form so as to prevent the main interface from covering the video layer. Then a display layer superimposed on the video layer is created, and the intelligent device decodes the obtained video data of the online video and displays the obtained video data of the online video on the display layer for playing the video data, such that the online video can be simultaneously played in the display layer when the boot video is playing, avoiding the issue that the intelligent device in the prior art has to wait for the loaded video data to be played after the boot video ends, resulting in a relatively long waiting time and lowering the user experience.

In a preferred embodiment, a boot player is provided, in Step S2, the boot player closes the display of the image layer and displays the loaded boot video in the video layer.

In the above-mentioned technical solution, 15 seconds of play duration of the boot video is preferred.

In a preferred embodiment, a method for displaying the main interface on the image layer in a transparent form comprises setting a background image and a view framework in the main interface to be invisible.

In the above-mentioned technical solution, after the system desktop launcher is started, a display attribute of the main interface is set such that the background image and the view framework are in a transparent form, that is, invisible.

In this way, the main interface is displayed in a transparent form, avoiding shielding the video layer below.

In a preferred embodiment, after the system is started, the intelligent device starts a monitoring module while creating the display layer, and monitors whether the boot video ends through the monitoring module;

the system desktop launcher operates to change a display content of the main interface from an invisible transparent state to a state of a visible operation interface when the boot video ends.

In the above-mentioned technical solution, after it is determined that the boot video ends through the monitoring module, performing an operation on the main interface. The system desktop launcher then changes the display attribute of the main interface set previously to be visible. After it is set, the main interface is displayed in the image layer, covering the video layer;

if the online video has not completed playing, the video data continues being played in the display layer until the video data ends, and the main interface is fully displayed in the image layer after the display layer is closed.

Figure 2:
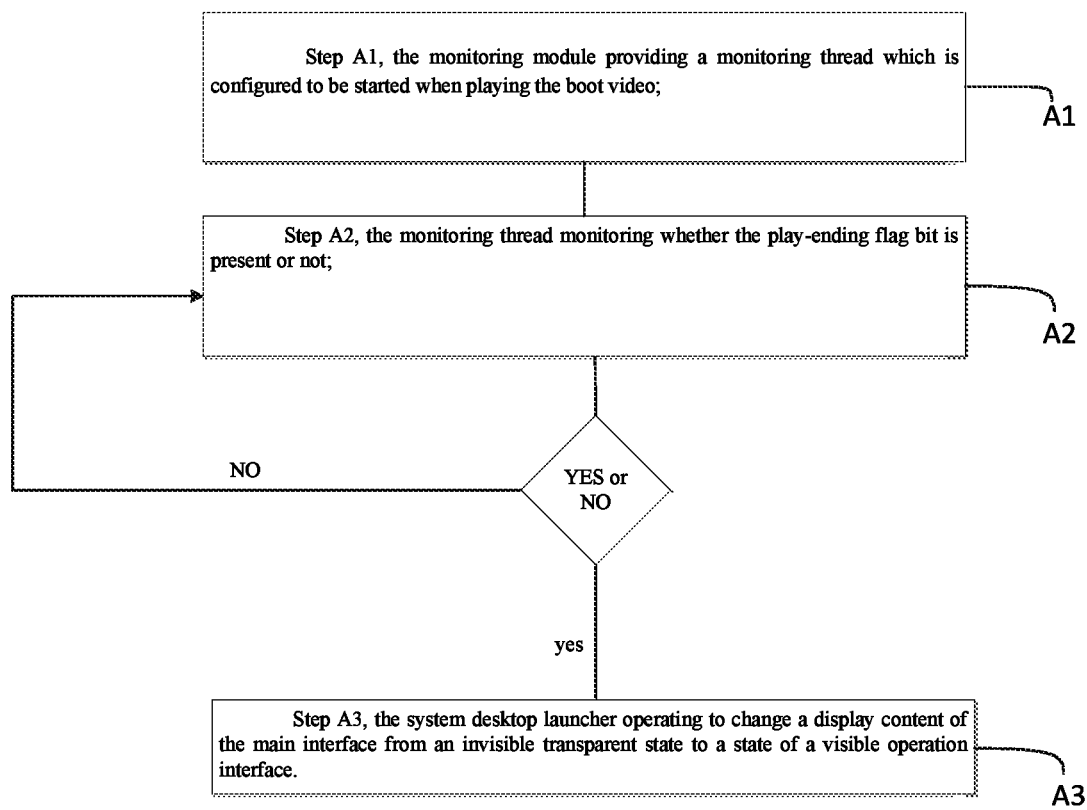
FIG. 2 is a flowchart of a method for monitoring whether a boot video playback ends or not in a video switching method based on multi-channel decoding according to an embodiment of the present invention.

In a preferred embodiment, as shown in FIG. 2, the boot video provides a play-ending flag bit, and a method for monitoring whether the boot video playback ends through the monitoring module comprises:

Step A1, the monitoring module providing a monitoring thread which is configured to be started when playing the boot video;

Step A2, the monitoring thread monitoring whether the play-ending flag bit is present or not;

if the result shows "NO", returning to Step A2;

if the result shows "YES", proceeding to Step A3;

Step A3, the system desktop launcher operating to change a display content of the main interface from an invisible transparent state to a state of a visible operation interface.

In the above-mentioned technical solution, it can be accurately determined whether the boot video ends through the play-ending flag bit. If the play-ending flag bit is detected, the system desktop launcher operates to change a display content of the main interface from an invisible transparent state to a state of a visible operation interface.

In a preferred embodiment, display coordinates of the display layer are located at a lower left corner of the image layer.

In the above-mentioned technical solution, the display layer can be displayed at any position of the image layer, preferably at the lower left corner of the image layer.

In a preferred embodiment, the display layer has a display size of 480*270.

In a preferred embodiment, after Step S5, after the boot video ends, the display size of the display layer is switched to a full screen display status of the image layer.

In a preferred embodiment, after Step S5, after the boot video ends, the display size of the display layer is switched to a full screen display status of the image layer, and the video data displayed in the image layer is adjusted from a mute state to a voiced state.

In the above-mentioned technical solution, in the process of playing the boot video, sound associated with the boot video can be heard. If the boot video has not completed playing, the video data played in the display layer is in a mute state. Only when the play-ending flag bit is detected can the display size of the display layer be switched to a full screen display status of the image layer, furthermore, the video data displayed in the image layer is adjusted from a mute state to a voiced state.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A video switching method based on multi-channel decoding, applied to the boot of an intelligent device, wherein a video layer and an image layer located on the video layer are provided, and the video layer is configured to play a boot video;

a system desktop launcher is provided, and after the system desktop launcher is started, a main interface is formed;

the video switching method comprises following steps:

Step S1, starting the intelligent device to accomplish the initialization operation of a system file;

Step S2, closing the display of the image layer, decoding an obtained boot video and displaying the boot video on the video layer;

Step S3, after the system desktop launcher is started, displaying the main interface on the image layer in a transparent form;

Step S4, after a system is started, the intelligent device creates a display layer and displays the display layer on the image layer, wherein a display area of the display layer is smaller than that of the image layer; and Step S5, decoding remotely obtained video data and displaying the video data on the display layer by the system desktop starter;

wherein after the system is started, the intelligent device starts a monitoring module while creating the display layer, and monitors whether the boot video ends through the monitoring module; and wherein the system desktop launcher operates to change a display content of the main interface from an invisible transparent state to a state of a visible operation interface when the boot video ends.

2. The video switching method as claimed in claim 1, wherein a boot player is provided, wherein in Step S2, the boot player closes the display of the image layer and displays the loaded boot video in the video layer.

3. The video switching method as claimed in claim 1, wherein a method for displaying the main interface on the image layer in a transparent form comprises setting a background image and a view framework in the main interface to be invisible.

4. The video switching method as claimed in claim 3, wherein the boot video provides a play-ending flag bit, and a method for monitoring whether the boot video ends through the monitoring module comprises:

Step A1, the monitoring module providing a monitoring thread which is configured to be started when playing the boot video;

Step A2, the monitoring thread monitoring whether the play-ending flag bit is present;

if the result shows "NO", returning to Step A2;

if the result shows "YES", proceeding to Step A3;

Step A3, the system desktop launcher operating to change a display content of the main interface from an invisible transparent state to a state of a visible operation interface.

5. The video switching method as claimed in claim 1, wherein display coordinates of the display layer are located at a lower left corner of the image layer.

6. The video switching method as claimed in claim 1, wherein the display layer has a display size of 480*270.

7. The video switching method as claimed in claim 1, wherein after Step S5, after the boot video ends, the display size of the display layer is switched to a full screen display status of the image layer.

8. The video switching method as claimed in claim 1, wherein after Step S5, after the boot video ends, the display size of the display layer is switched to a full screen display status of the image layer, and the video data displayed in the image layer is adjusted from a mute state to a voiced state.

* * * * *